United States Patent [19]

Bloch

[11] Patent Number: 4,921,735

[45] Date of Patent: May 1, 1990

[54] AIR BAG FOR MOTOR VEHICLES

[76] Inventor: Klaus Bloch, Schwalbenweg 17, 5205 Augustin 1, Fed. Rep. of Germany

[21] Appl. No.: 244,661

[22] Filed: Sep. 14, 1988

[30] Foreign Application Priority Data

Nov. 3, 1987 [DE] Fed. Rep. of Germany ... 8714595[U]

[51] Int. Cl.[5] ............................................. B60R 21/16
[52] U.S. Cl. .................................. 428/34.9; 139/387 R; 139/389; 280/741; 280/743; 280/728; 428/225; 428/229; 428/252; 428/920; 28/165
[58] Field of Search ...................... 280/741, 743, 728; 428/34.9, 252, 920, 225, 229; 55/527, DIG. 45; 383/3, 387 R; 139/389, 420 A, 426 R; 28/165

[56] References Cited

U.S. PATENT DOCUMENTS

| | | | |
|---|---|---|---|
| T941,015 | 12/1965 | Hoyle et al. | 28/165 |
| 3,842,583 | 10/1974 | Gage | 280/743 |
| 3,879,057 | 4/1975 | Kawashima et al. | 280/743 |
| 3,991,249 | 11/1976 | Yamashita et al. | 428/35.5 |
| 4,559,975 | 12/1985 | Stits | 139/420 R |

Primary Examiner—Henry F. Epstein
Assistant Examiner—Archene A. Turner
Attorney, Agent, or Firm—Herbert Dubno

[57] ABSTRACT

An air bag for motor vehicle use is made of a synthetic fabric, particularly a polyamide, with a extremely tight weave, which is shrunk, heat set, and calendered at a temperature between 60° and 225° C., a pressure between 10 and 100 t, and a calendering speed between 5 and 25 m/min.

12 Claims, 2 Drawing Sheets

AIR BAG FOR MOTOR VEHICLES

FIELD OF THE INVENTION

My present invention relates to an air bag for use in motor vehicles, the air bag being made of synthetic fabric.

BACKGROUND OF THE INVENTION

Air bags for motor vehicles are known which are composed of rubberized fabrics. For instance, one such type of air bag is the so-called steering wheel air bag and another is the so-called rider's air bag. In the current art, air bags for motor vehicles have generally been made from rubberized polyamide fabrics.

The rubberizing is necessary because of the permeability of the polyamide fabric to air, and only the rubberizing of the fabric enables the air bag to perform properly when inflated.

In order to enable these rubberized polyamide air bags, which are folded up very compactly, to remain operative for many years and to enable them to unfold without difficulty when they are called upon to function, it is necessary to have the inner rubberized surface of the air bag powdered with talcum powder. This talcum powder keeps the adjacent interleaved rubberized surfaces from sticking to one another over the course of time.

However, experiments have shown that when the air bag unfolds explosively when it is called upon to perform, this talcum powder, as well as fine particles from the rubber and from the gas mixture blown into the air bag at the moment of use, are driven through the partly permeable rubberized coating and through the fabric. This particulate matter can penetrate into the eyes and breathing passages of the passengers, obviously with adverse effects.

Other difficulties having to do with the rubberized treatment are: sticking of adjacent layers; loss of impermeability and strength on prolonged storage; microorganism attack; and adverse interactions of the rubber ingredients with metals, with polyurethane foam, and plastics. Such rubberized fabrics are also undesirably heavy.

OBJECTS OF THE INVENTION

It is an object of the invention to provide an air bag for use in motor vehicles which is age-resistant and maintains its ability to function over many years, and which, as it unfolds when called upon to function, presents no risk for driver or rider.

It is a further object to provide such an air bag which is light in weight, decay-resistant, and capable of being packed tightly without having the layers stick to each other.

It is yet another object to provide such an air bag which is practicable to manufacture and which is inert to the other materials in its vicinity in the motor vehicle.

SUMMARY OF THE INVENTION

These and other objects of the invention are achieved in an air bag for use in a motor vehicle, this air bag being made of a synthetic fabric having a superfilled weave, which is shrunk, heat set (thermofixed) and calendered at a temperature between 60° and 225° C., a pressure between 10 and 100 t (metric tons), and a calendering speed between 5 and 25 m/min. The fabric as used can be nonrubberized and otherwise not coated by any sealing material.

By the term "superfilled weave" is meant that the fabric has an extremely dense fill (i.e. essentially no space between threads), and has the warp also as tight as technically feasible. By means of the shrinking, thermofixing, and calendering, the fabric finally is densified to the point where it is practically impermeable to air.

Experiments have shown that the fabric retains an air permeability of only between 0 and 5 liters/dm$^2$/min at 20 mm of water-column pressure in accordance with DIN 53887.

The fabric is, however, lighter in weight than the rubberized fabric presently used for air bags, and it can therefore allow weight savings of up to 35%. Furthermore, this fabric has, because of its superfilled weave, also up to 80% higher tear resistance and tear propagation resistance compared to the usual rubber-coated polyamide fabrics.

The air bag, being made exclusively of synthetic fibers, is also resistant to aging and to decay, and it can be packed as tightly as desired, without danger of the adjacent layers sticking to each other.

Most generally, the fabric can be woven in various known weaves such as twill, satin, repp, panama, and bifilar canvas or cotton-duck weave. A preferred embodiment is a plain weave (basketweave) with 34 fill (weft or woof) threads per cm at a weight of 470 dtex and 16 warp threads per cm at a weight of 470 dtex.

Especially favorable results are achieved when the fabric is calendered at a temperature between 130° and 160° C., a pressure between 30 and 50 t, and a calendering speed between 5 and 7 m/min.

The resultant fabric has a weight of 280 ±10 g/m$^2$ and a thickness of 0.39 ±0.02 mm.

The fabric can be constructed of any shrinkable and thermofixable synthetic fibers, such as polyester, aramid, PPS (polyphenylene sulfide), polyimide, and the like. The preferred embodiment of the invention is that in which the fabric is made of polyamide fiber.

Usually, air bags for motor vehicles are additionally provided with gripping straps and a fire protector in the region of the mouthpiece. In this regard, it is the current practice to use broad diagonally-positioned fabric straps rubberized on both sides, this entailing the disadvantages hitherto mentioned. These disadvantages may be avoided by using, in accordance with the invention, straps and/or a fire protector consisting of PTFE (polytetrafluoroethylene), polyamide, aramid, copolyimide, or PPS yarn or fibers.

These materials for the straps or for the fire protector are inert with respect to the metals in the area of the steering wheel or with respect to integral polyurethane foam or deep-drawn plastic sheeting, so that no adverse changes are likely to occur which could affect the functioning of the air bag. Moreover, these materials are also highly heat resistant and have excellent strength, so that the cross-section of the straps and/or the fire protector can be correspondingly reduced, thus permitting a saving of weight.

BRIEF DESCRIPTION OF THE DRAWING

The above and other objects, features and advantages of the present invention will become more readily apparent from the following description, reference being made to the accompanying drawing in which.

SPECIFIC DESCRIPTION

The fabric shown is specifically designed for use in air bags for motor vehicles. It consists of synthetic fibers, which are woven in the tightest possible manner into a basketweave.

The fabric depicted has 34 fill yarns per cm of dtex 470 yarn weight and 16 warp yarns per cm of dtex 470 yarn weight.

The fabric consists of polyamide yarn, and is preshrunk, heatset, and then finally calendered at between 130° and 160° C., a pressure between 30 and 50 t, and a calendering speed between 6 and 7 m/min.

Upon calendering or otherwise finishing the fabric, it is possible to apply powders or films, for example in the form of hot melt adhesives or aqueous dispersions of fluorinated thermoplastic resins, for the purpose of sealing and providing additional heat resistance to the air bag or the gripping straps, although rubber can be avoided and these coating materials, although advantageous, are by no means necessary.

The straps made of rubberized stretchable polyamide (stretchable in one dimension only) are stretched when the air bag is expanded with gas (within milliseconds up to a 5 atmosphere inner pressure); by means of the rubberized stretchable straps, energy is taken up. Upon releasing the pressure in the air bag (escape of the air/gas mixture through the exit opening provided), these straps, by means of the reversible extensibility of the rubberized polyamide stretch fabric, return the air bag back to its original form and size.

Figure 1:
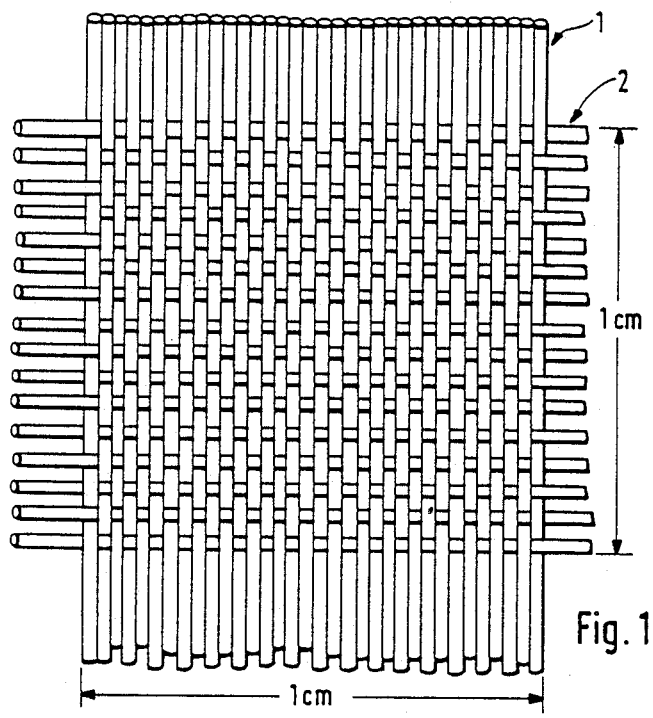
FIG. 1 is a front view of a piece of the fabric.
Figure 2:
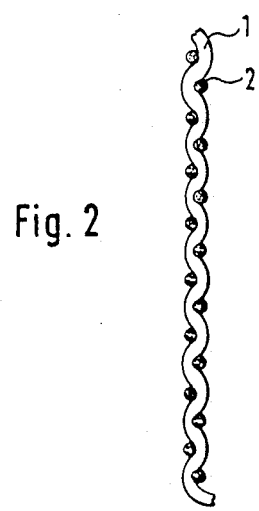
FIG. 2 is a cross-section of the object of FIG. 1.
Figure 3:
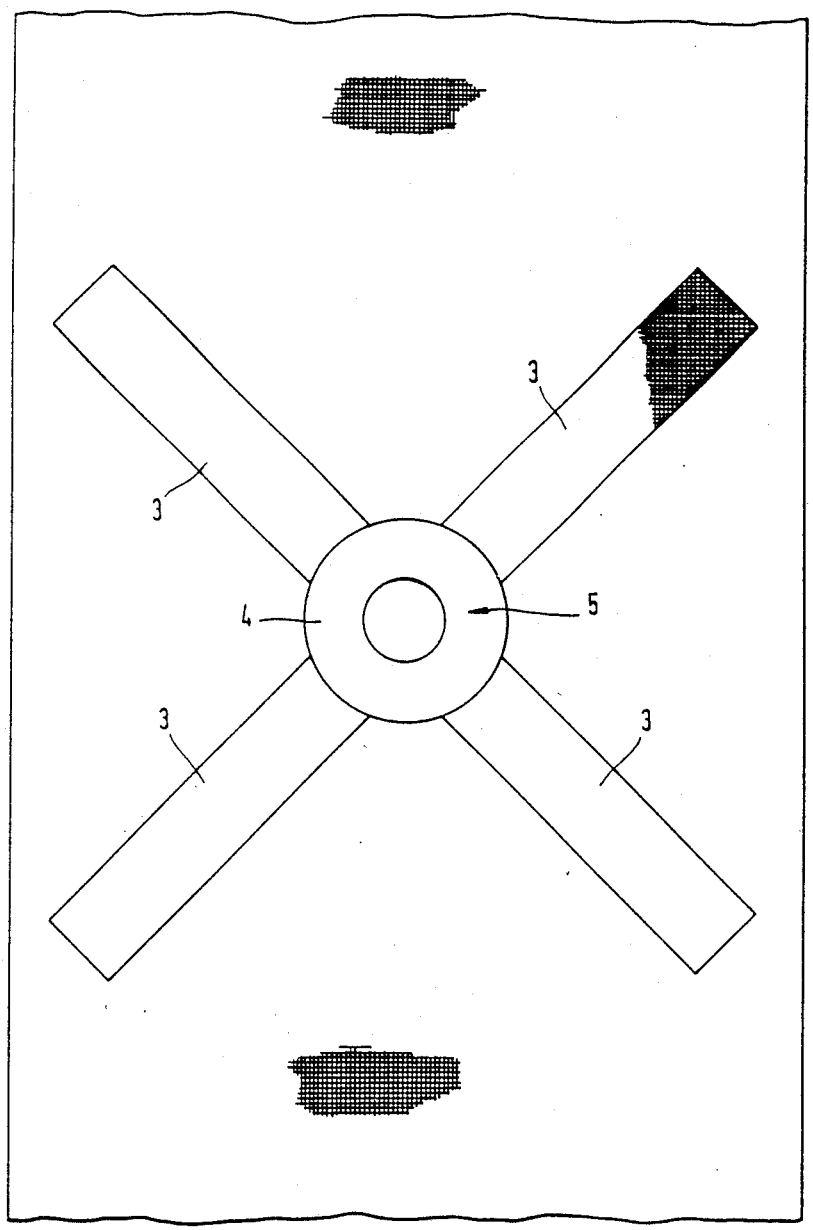
FIG. 3 is a front view showing the construction of the gripping straps.

FIG. 3 depicts for the package a construction of the gripping straps 3 together with a fire protector 4 which is provided around the mouthpiece 5 of the air bag, consisting of a unit wherein the strap/fire protector construction is cut at an angle of 45° to the direction of the polyamide stretch yarn.

The strap and fire protector structures made of rubberized polyamide stretch fabric can alternatively consist of two or more units.

I claim:

1. An air bag for motor vehicles which is comprised of a synthetic fabric of superfilled weave, said fabric being shrunk, heat set, and calendered at a temperature of between 60° and 225° C., a pressure of between 10 and 100 t, and a calendering speed between 5 and 25 m/min.

2. The air bag defined in claim 1 wherein said fabric has a plain weave with 34 fill threads/cm at a thread weight of dtex 470 and 16 warp threads/cm at a thread weight of dtex 470.

3. The air bag defined in claim 1 wherein said fabric is calendered at a temperature between 130° and 160° C., a pressure between 30 and 50 t, and a calendering speed between 5 and 7 m/min.

4. The air bag defined in claim 1 wherein said fabric has a weight of 280 ±10 g/m² and the thickness of 0.39 ±0.02 mm.

5. The air bag defined in claim 1 wherein said fabric is selected from the group consisting of polyester, aramide, polyphenylene sulfide and polyimide.

6. The air bag defined in claim 1 wherein said fabric is comprised of polyamide fibers.

7. The air bag defined in claim 1 which is provided with a mouthpiece in the region of which are provided straps and a fire protector, said straps consisting of yarns selected from the group consisting of polytetrafluoroethylene, polyamide, aramid, copolyimide and polyphenylene sulfide.

8. The air bag defined in claim 7 which is provided with straps comprised of a rubberized stretch fabric.

9. The air bag defined in claim 8 which is provided with straps comprised of a rubberized polyamide stretch fabric.

10. The air bag defined in claim 8 which is provided with straps which are cut at 45° with respect to the weave.

11. An air bag for motor vehicles which is comprised of a tightly filled polyamide fabric, said fabric having a plain weave with 34 fill threads/cm at a thread weight of dtex 470 and 16 warp threads/cm at a thread weight of dtex 470, said fabric being shrunk, heat set, and calendered at a temperature of between 130° and 160° C., a pressure of between 30 and 50 t, and a calendering speed between 6 and 7 m/min, said fabric having a weight of 280 ±10 g/m² and the thickness of 0.39 ±0.02 mm.

12. An air bag for motor vehicles as defined in claim 11 which is provided with at least one strap and fire protector, said fire protector being around the mouthpiece of said air bag, said straps and fire protector being made of polyamide stretch yarn cut from rubberized polyamide fabric, and said straps being at an angle of 45° with respect to said weave.

* * * * *